Jan. 6, 1959    C. C. SHALE    2,867,478
PULSATING COUNTER-FLOW FEEDER
Filed June 9, 1958
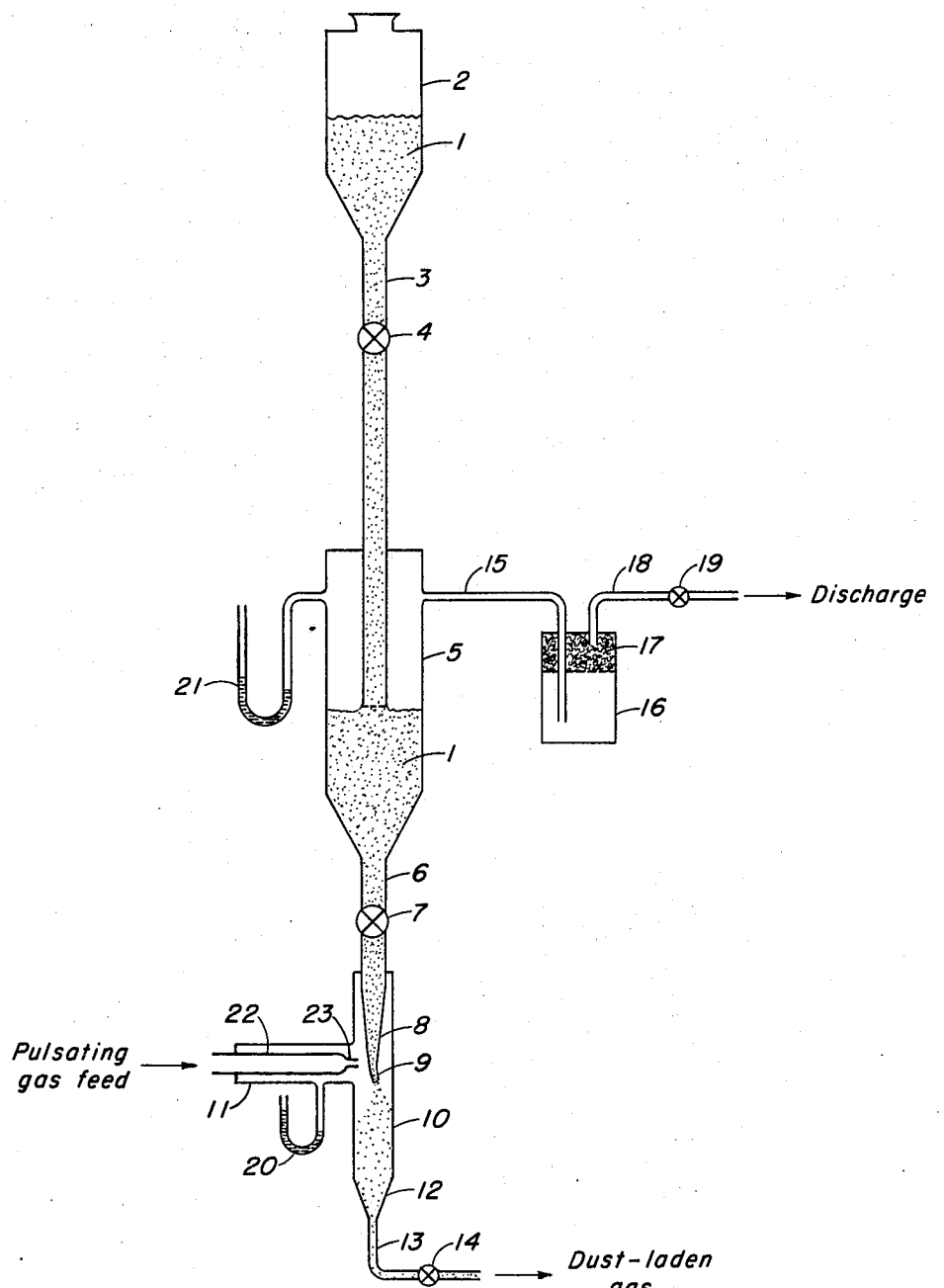
INVENTOR.
Correll C. Shale
BY
ATTORNEY

United States Patent Office 2,867,478
Patented Jan. 6, 1959

2,867,478

PULSATING COUNTER-FLOW FEEDER

Correll C. Shale, Morgantown, W. Va., assignor to the United States of America as represented by the Secretary of the Interior Application June 9, 1958, Serial No. 740,983

6 Claims. (Cl. 302—26)

(Granted under Title 35, U. S. Code (1952), sec. 266)

The invention herein described and claimed may be manufactured and used by or for the Government of the United States of America for governmental purposes without the payment of royalties thereon or therefor.

The invention relates to an improved method and apparatus for introducing known concentrations of pulverulent solids of desired maximum size into a gas stream. A method for continuously introducing known quantities of dust or powder of known size into a gas stream is desirable for many purposes, including chemical reactions where the powdered solid is a reactant or a catalyst, and in investigations of the properties of dust-laden gas streams.

It is an object of my invention to provide means for introducing powdered materials of desired size continuously into a gas stream.

It is a further object of my invention to provide means to convey powdered solids by a pulsating gas stream.

It is a further object of my invention to provide an apparatus for entraining powdered solids in a pulsating gas stream, wherein the powder is maintained in a fluidized state in a vertical tube and is withdrawn therefrom intermittently.

It is a further object of my invention to provide means for controlling the rate of solid withdrawal.

Other objects will be apparent from the following specification and claims.

According to my method, the powder is fed into a pulsating gas stream from a vertical tube connected to a hopper. The bottom of the tube is equipped with a nozzle extending into the gas stream conduit and as the pressure of the pulsating gas alternately reaches the maximum and minimum pressure valves, gas flows upwardly through the nozzle into the hopper or downwardly through the nozzle out of the hopper into the original stream. A limited quantity of gas enters the hopper and is permitted to pass from the top of the hopper to the atmosphere, thereby establishing an equilibrium at any given set of operating conditions, in which an average static pressure exists inside the hopper. This pressure differs from the average pressure in the original gas stream by the losses incurred by gas flowing through the nozzle and the bed of solids in the hopper.

The bed in the hopper exists in a packed state and all bleed gas flows through the bed by channeling at a point remote from the bottom of the connecting tube. A fluidized state exists in the vertical tube where the velocity of the gas is relatively high, and during the downward flow of gas an increment of powder is ejected through the nozzle with the gas.

The rate of feed of solids is a function of the number and size of orifices, bleed rate of gas from the top of the hopper, pressure of the pulsating gas stream, and the amplitude and frequency of the impulse. It is conceivable that the maximum frequency at which the feeder will operate is a function of the inertia of the particles. At constant pressure (zero frequency) no feeding occurs.

The invention will be better understood by reference to the drawing in which the single figure is a diagrammatic view in section of one embodiment. Finely divided solid material, or dust 1, is shown in the figure as being stored in reserve hopper 2 communicating via tube or conduit 3 and valve 4 with feed hopper 5. Material is charged to hopper 2 by closing valve 4, and then adding the material through an opening at the top of 2, which normally remains closed. After filling hopper 2, the opening is closed and valve 4 opened. The level of the bed of finely divided solid particles in hopper 5 is maintained at a constant height determined by the position of the lower end of tube 3. Flow of solids from hopper 2 to the feed hopper 5 is continuous as long as supply tube 3 contains a supply of fine solids. Feed hopper 5 is connected at its tapered bottom to a connecting vertical tube 6, having a valve 7, a tapered end portion 8, and terminating in a nozzle orifice 9. Tapered portion 8 is located with a T member 10, having side arm 11, and a bottom tapered section 12. Exit conduit 13 having a valve 14 is connected at the bottom of 12 and serves to remove the dust laden gas, as will be explained further below. Located within side arm 11 is gas inlet tube 22 having a nozzzle orifice 23. A pulsating gas stream having a constant average pressure flows through tube 22, and out through orifice 23. As shown in the drawing, the inlet gas orifice 23 is located adjacent to and somewhat above orifice 9.

Near the top of hopper 5 is a bleeder pipe 15 which leads into a dust trap 16 having fibrous material 17, such as glass wool for example, to trap any very fine powder which may be carried out by the bleed gas. Line 18 having a valve 19 connects the dust trap to the atmosphere.

Gas is supplied to tube 22 from a source which provides for a rapidly alternating cycle of maximum and minimum pressures. In one embodiment, for example, air from the exhaust end of a vacuum pump was employed, the cycle being in this case 750 impulses per minute or 12.5 per second.

Nozzle orifice 9 may be at an angle from the horizontal of from 20° to 70°. Approximately 30° appears to give the best results, however.

Manometers 20 and 21 are connected to side arm 11 and feed hopper 5 above the bed level to indicate the pressures at these points. A flow meter (not shown) measures the flow of bleed gas through line 18.

The operation of the device having a uniform average pressure and a maximum and minimum pressure in every pressure cycle as follows: Hopper 5 is charged with powder and valves 4, 7, 14, and 19 are opened. Pulsating gas is led into vessel 10 through tube 22 and nozzle 23. At the maximum pressure a small portion of air enters orifice 9 and flows up through tube 6 and feed hopper 5 and discharges through bleed line 15, dust trap 16, and line 18. At minimum gas pressure the gas flow through orifice 9 is reversed, the gas flows outwardly, and a small quantity of powder is entrained. The material in tube 6 is kept in a fluidized state by the rapidly pulsating upward gas flow. Material in feed hopper 5 is in a packed state and gas flows through the bed by channeling at a point remote from the bottom of tube 3. It may be necessary to off-set tube 3 from the center of hopper 5 to eliminate any fluidizing effect at the spot immediately under the bottom of tube 3. The bed must remain in a packed condition in this area.

The small quantity of powder entrained in the gas flowing out from orifice 9 at the minimum pressure is entrained by gas at the maximum pressure and passes downwardly and out through 13, and is conveyed by the gas stream where desired. The over-all effect is a continuous slightly pulsating flow of gas through bleed tube 15 and an intermittent discharge of dust from the orifice 9 into the main gas stream. Since the frequency of this discharge is high, the resulting dispersion for all practical purposes is continuous.

The taper 8 in line 6 is not critical, except to the extent that the powdered material may bridge across if the angle of taper is too great. Should this occur, the solids will not slide freely to the nozzle orifice 9. If the taper angle is too small the length of line 6 becomes inordinately long. It is important to avoid any abrupt changes in shape or angle since this could cause turbulence and affect the flow of solids.

There does not appear to be any critical relationship between the location of orifices 23 and 9, except that the inlet gas orifice must be a slight distance above the nozzle orifice 9 to eliminate excessive dust accumulation in gas eddies above orifice 9. Dust emerging from the orifice is dispersed in the pulsating gas stream, apparently by turbulent flow.

Orifice 9 must be large enough to avoid any bridging of the particles, but not so large as to permit equalization of pressure in vessel 10 and hopper 5 and line 6.

The rate at which this powdered material is removed from tube 6 depends in the main on the following variables: (*a*) bleed gas rate, (*b*) average operating pressures and impulse magnitude, (*c*) frequency of impulse, (*d*) depth of bed in feed hopper, (*e*) size of material feed orifice 9, and (*f*) size of gas orifice 23.

As the bleed gas rate increases, fluidization increases in 6 and 8 and a lower concentration of powdered material is there present. Each minimum pressure pulse results therefore in a lesser quantity of solid being removed and hence a lower feed rate. Conversely, decreasing the bleed gas rate decreases fluidization in 6 and 8 and increases the quantity of material removed per pulse.

The operating pressure as measured by manometer 20 is the mean between the high and low pressures of the impulses. Inertia of the liquid in the manometers prevents determination of their absolute magnitudes, but with other instrumentation this could be secured. In general, it was found that things being equal, an increase in the average pressure results in an increase in the solid material flow rate.

Increasing the frequency of impulse should increase the flow rate up to a certain limit, which is a function of the inertia of the individual particles. Conceivably, there would be no flow at all when a certain critical limit is exceeded. At zero frequency, the flow ceases.

The feed rate decreases as the depth of the bed in hopper 5 and tube 6 increases, while maintaining the same gas bleed rate. The size of the nozzle orifice is directly related to the feed rate, other things being equal. The rate also increases as the inlet orifice area increases, although the change is relatively small over a wide range of areas. It is not necessary that these orifices be circular.

In practice, the rate of solid material flow is kept constant by maintaining the difference in pressure between the feed hopper 5 and chamber 10 constant. This may be done manually, or by automatic controls connected to the pulsating gas supply.

In actual operation, a batch of finely divided solid material is placed in reserve hopper 2, valves 4, 7, and 19 being closed and valve 14 opened. The pulsating gas feed at a desired pressure is admitted into an inlet line 22. Valve 4 is then opened until the feed hopper has a predetermined depth of powder. Bleed valve 19 and valve 7 are then opened and the bed expands, due to the bleed gas flowing through tube 6 and solid 1 becoming fluidized in tube 6. The rate of solid removal is then controlled by varying the pressure difference between chamber 10 and hopper 5, as by valve 14, valve 19, or the pressure of the gas supply at its source.

In one embodiment of this invention designed to supply a constant quantity of dust-air mixture, the dimension and constants employed were as follows:

Size of solid particles, up to 150 microns
Number of pulsations per second, 12.5
Average operating pressure, 40 inches of water
Feed nozzle orifice diameter—0.075 cm.
Inlet air orifice diameter—0.140 cm.
Hoppers 2 and 5—2 in. glass tubing
Lines 3, 6, and 15—12 mm. glass tubing
Vessel 10 and arm 11—¾ in. glass tubing
Height of bed—8 inches
Pressure differential between 5 and 10—8.5 inches of water
Air feed rate—25 cu. ft./hr.
Air bleed rate—0.18 cu. ft./hr.
Rate of direct feed flow—22.6 grams/hr.

The dimension of this apparatus may be varied in accordance with the quantity of solids it is desired to convey. Although the specific example discloses a glass apparatus, it is obvious that any of the usual material of construction may be employed, mild steel for example. Gages and recorders may be connected at suitable points in the apparatus to record rate of flow pressure, temperature, etc. A plurality of nozzles may be employed if desired.

I claim:

1. A method for entraining finely divided solid particles in a gas stream, which comprises the steps of maintaining a mass of finely divided particles in a packed state in a storage zone, as set forth hereinafter, said storage zone having a vertical conduit zone at the bottom thereof, terminating in a rearwardly extending nozzle portion having an orifice, impinging a pulsating gas jet on said nozzle portion, said gas jet and nozzle portion being enclosed in a pressure zone, the direction of gas flow being so to entrain solid particles flowing from said orifice, said pulsating gas jet having a pressure cycle which varies from a maximum pressure to a minimum pressure, passing a portion of the gas at the period of maximum pressure through the conduit zone at a velocity at least sufficient to maintain the finely divided solid therein in a fluidized condition, and then through the storage zone at a lower velocity, whereby an upper level of solid material in a packed, non-fluidized state is maintained in the storage zone, withdrawing the said gas portion from a region above the solids level in said storage zone, discharging finely divided solids from the nozzle portion during the period of minimum gas pressure, entraining said solid in the gas stream, and removing said solid laden gas stream from the pressure zone.

2. A method as in claim 1, wherein the amount of gas withdrawn from the storage zone is controlled to vary the quantity of solids removed.

3. A method as in claim 1, wherein the average pressure of the pulsating gas jet is controlled to vary the quantity of solids removed.

4. Apparatus for entraining finely divided solid particles in a gas stream which comprises a storage means containing said finely divided solid particles, a vertically extending conduit located at the lower portion of said storage means, said vertical conduit terminating in a first nozzle means having its axis downwardly and rearwardly inclined, a second nozzle means spaced above and laterally from said first nozzle means in close proximity thereto, a chamber surrounding said first and second nozzle means, means for passing a pulsating gas jet through said second nozzle means, means for withdrawing gas from the upper portion of said storage means, and means for withdrawing solid particle laden gas from said chamber.

5. Apparatus for entraining finely divided solid particles in a gas stream which comprises a storage means containing said finely divided solid particles, a vertically extending conduit located at the lower portion of said storage means, said vertical conduit terminating in a first nozzle means having its axis downwardly and rearwardly inclined, a second nozzle means spaced above and laterally from said first nozzle means in close proximity thereto, the axes of the nozzles being in substantially the same vertical plane, a chamber surrounding said first and second nozzle means, means for passing a pulsating gas jet through said second nozzle means, means for withdrawing gas from the upper portion of said storage means, and means for withdrawing solid particle laden gas from said chamber.

6. Apparatus for entraining finely divided solid particles in a gas stream which comprises a storage means containing said finely divided solid particles, a vertically extending conduit located at the lower portion of said storage means, said vertical conduit terminating in a first nozzle means having its axis downwardly and rearwardly inclined, a second nozzle means spaced above and laterally from said first nozzle means in close proximity thereto, a chamber surrounding said first and second nozzle means, means for passing a pulsating gas jet through said second nozzle means, first conduit means for withdrawing gas from the upper portion of said storage means, valve means in said conduit means to control the gas flow therethrough and second conduit means for withdrawing solid particle laden gas from said chamber, said second conduit means having valve means therein.

References Cited in the file of this patent

UNITED STATES PATENTS

| 2,726,137 | Davis | Dec. 6, 1955 |
| 2,771,323 | Taylor | Nov. 20, 1956 |
| 2,829,007 | Van Waveren | Apr. 1, 1958 |